(12) United States Patent
Bernard et al.

(10) Patent No.: US 10,901,900 B2
(45) Date of Patent: Jan. 26, 2021

(54) SYSTEM AND METHOD FOR MANAGING CACHE COHERENCE IN A NETWORK OF PROCESSORS PROVIDED WITH CACHE MEMORIES

(71) Applicants: Commissariat a l'energie atomique et aux ene alt, Paris (FR); BULL SAS, Les Clayes-sous-Bois (FR)

(72) Inventors: Christian Bernard, Saint Etienne de Crossey (FR); Eric Guthmuller, Ruy (FR); Huy Nam Nguyen, Fresnes (FR)

(73) Assignees: COMMISSARIAT A L'ENERGIE ATOMIQUE ET AUX ENERGIES ALTERNATIVES, Paris (FR); BULL SAS, Les Clayes-sous-Bois (FR)

( * ) Notice: Subject to any disclaimer, the term of this patent is extended or adjusted under 35 U.S.C. 154(b) by 357 days.

(21) Appl. No.: 14/394,982

(22) PCT Filed: Apr. 12, 2013

(86) PCT No.: PCT/FR2013/050802
§ 371 (c)(1),
(2) Date: Oct. 16, 2014

(87) PCT Pub. No.: WO2013/156716
PCT Pub. Date: Oct. 24, 2013

(65) Prior Publication Data
US 2015/0106571 A1     Apr. 16, 2015

(30) Foreign Application Priority Data

Apr. 16, 2012 (FR) .................... 12 53498

(51) Int. Cl.
*G06F 12/08* (2016.01)
*G06F 12/0817* (2016.01)
*G06F 12/0813* (2016.01)

(52) U.S. Cl.
CPC ...... *G06F 12/0828* (2013.01); *G06F 12/0813* (2013.01); *G06F 12/0817* (2013.01); *G06F 2212/254* (2013.01); *G06F 2212/621* (2013.01)

(58) Field of Classification Search
CPC .......... G06F 12/0817; G06F 2212/254; G06F 2212/621; G06F 12/0828; G06F 12/0813
See application file for complete search history.

(56) References Cited

U.S. PATENT DOCUMENTS 5,983,326 A * 11/1999 Hagersten ........... G06F 12/0813
711/140
6,141,692 A * 10/2000 Loewenstein ....... G06F 12/0813
709/212

(Continued)

FOREIGN PATENT DOCUMENTS

EP     0 911 736     4/1999

OTHER PUBLICATIONS

Eisley et al., "In-Network Cache Coherence", Microarchitecture, pp. 1-12, Dec. 1, 2006.*

(Continued)

*Primary Examiner* — David Yi
*Assistant Examiner* — Zubair Ahmed
(74) *Attorney, Agent, or Firm* — Oblon, McClelland, Maier & Neustadt, L.L.P.

(57) ABSTRACT

A cache coherence management system includes: a set of directories distributed between nodes of a network for interconnecting processors including cache memories, each directory including a correspondence table between cache lines and information fields on the cache lines; and a mechanism updating the directories by adding, modifying, or deleting cache lines in the correspondence tables. In each correspondence table and for each cache line identified, at least one field is provided for indicating a possible blocking (Continued)

of a transaction relative to the cache line considered, when the blocking occurs in the node associated with the correspondence table considered. The system further includes a mechanism detecting fields indicating a transaction blocking and restarting each transaction detected as blocked from the node in which it is indicated as blocked.

9 Claims, 3 Drawing Sheets

(56) References Cited

U.S. PATENT DOCUMENTS

| | | | |
|---|---|---|---|
| 6,154,816 A | 11/2000 | Steely et al. | |
| 7,263,586 B1 * | 8/2007 | Kapil | G06F 12/0831 711/141 |
| 2002/0174255 A1 * | 11/2002 | Hayter | G06F 13/128 709/250 |
| 2003/0191906 A1 | 10/2003 | Chen et al. | |
| 2005/0243722 A1 * | 11/2005 | Liu | H04L 12/1868 370/235 |
| 2010/0049922 A1 | 2/2010 | Aronovich et al. | |
| 2010/0262972 A1 * | 10/2010 | Cocks | G06F 9/524 718/104 |
| 2012/0271886 A1 | 10/2012 | Aronovich et al. | |
| 2012/0271887 A1 | 10/2012 | Aronovich et al. | |
| 2012/0272012 A1 | 10/2012 | Aronovich et al. | |
| 2012/0272014 A1 | 10/2012 | Aronovich et al. | |
| 2012/0278392 A1 | 11/2012 | Aronovich et al. | |

OTHER PUBLICATIONS

Eisley, N., et al., "In-network Cache Coherence", Microarchitecture, pp. 1-12, (Dec. 1, 2006) XP 031034181.

Thapar, M., et al., "Linked List Cache Coherence for Scalable Shared Memory Multiprocessors", IEEE, pp. 34-43, (Apr. 13, 1993) XP 010031918.

Zhang, Y., et al., "Towards Hierarchical Cluster based Cache Coherence for Large-Scale network-on-Chip", Design & Techonology of Integrated Systems in Nanoscal Era, Total 4 Pages, (Apr. 6, 2009) XP 031456362.

Lankes, A., et al., "Comparison of Deadlock Recovery and Avoidance Mechanisms to Approach Message Dependent Deadlocks in on-Chip Networks", Fourth ACM/IEEE International Symposium on Networks-on-Chip, pp. 17-24, (Jul. 12, 2010) XP 002691715.

International Search Report dated Jun. 7, 2013 in PCT/FR13/050802 Filed Apr. 12, 2013.

* cited by examiner

Figure 2

| tag | | V | NSEW | RD | C | R | T | P | Typ | |
|---|---|---|---|---|---|---|---|---|---|---|
| set | ... | | | | | | | | | ... |
| | | | | | | | | | | |

SYSTEM AND METHOD FOR MANAGING CACHE COHERENCE IN A NETWORK OF PROCESSORS PROVIDED WITH CACHE MEMORIES

This invention relates to a system for managing cache coherence in a network of processors equipped with cache memories. It also relates to a corresponding method and computer program.

A cache memory is intended to store, temporarily and as close as possible to the computing means of a computing system, for example one or more microprocessors, data also stored in a main memory and used for reading and writing by the computing means. By being inserted between the computing means and the main memory intended to be called upon for reading or writing of data by these computing means, and by being in the form of a smaller memory, but with faster access than the main memory, the cache memory makes it possible to accelerate computations. The main use of the cache memory is as follows: all operations of reading or writing data in the main memory performed by the computation means are first directed to the cache memory; if the data is in the cache memory (success, or cache "hit"), it is directly returned to the computing means (read) or updated in the cache memory (write); if, on the other hand, it is not in the cache memory (failure, or cache "miss"), it is transferred from the main memory to the cache memory before being provided to the computing means (read) or stored in the cache memory before being transferred to the main memory (write).

In practice, multiple cache memory levels may be provided between the computation means and the main memory.

In addition, a data line defined as consisting of a predetermined number of successive data words stored in the cache or main memory (i.e. a data line consists of neighboring data), is the smallest quantity of data capable of being exchanged between a cache memory and the main memory, bearing in mind that a data word is the smallest quantity of data that must be accessible for reading or writing by the computation means. Thus, the cache memory takes advantage not only of the principle of temporal locality of the data, according to which data recently used by the computation means are very likely to be reused in the near future and must therefore be stored temporarily in the cache memory, but also of the principle of spatial locality of data, according to which the data neighboring data recently used by the computation means is very likely to be used in the near future and must therefore be stored temporarily in the cache memory with the data recently used, which it neighbors.

A correspondence must be established between each cache memory and the main memory in order to know how to temporarily assign a data line of the cache memory, called a cache line, to any one data line stored in the main memory, bearing in mind that the main memory comprises a number of data lines clearly higher than the number of cache lines. The known systems for managing correspondence between the cache memory and the main memory generally implement one of the following three principles:
 the fully associative correspondence,
 the pre-established correspondence,
 the N-way set associative correspondence.

The first principle of fully associative correspondence consists in assigning a priori any cache line to any one of the data lines of the main memory. No preliminary assignment of cache zones to main memory zones is established. The choice of assignment of a cache line to a data line is therefore free and is based, in practice, on availability or age criteria of the data in the cache, which is optimal for the success rate of the cache memory, but has the disadvantage of being somewhat complex.

The second principle of pre-established correspondence consists in applying a modulo function to the address of each data line of the main memory, so that the same cache line is assigned a priori to a plurality of data lines, separated successively by a constant distance (i.e. the modulo) in the main memory. Thus, the preliminary assignment of cache zones to main memory zones is entirely deterministic and the assignment of a cache line to a data line is imposed by the modulo function. This is optimal in terms of simplicity, but has the disadvantage of a generally unsatisfactory cache memory success rate.

Finally, the third principle of N-way set associative correspondence, which fall between the first two, consists in a preliminary assignment of a set to each data line of the main memory on the basis of its address, each set being distributed in the cache memory in N predefined ways, then of assigning any cache line to any one of the data lines of the main memory in the set assigned to it, i.e. concretely, one line per way. Thus, a preliminary assignment of cache zones to zones of the main memory is established, but the assignment of a cache line to a data line nevertheless retains some freedom in the set assigned to it. The final choice of assignment of a cache line to a data line is then made, in practice, on the basis of availability or age criteria of the data in the cache, similar to those performed in the first principle, but simplified.

In most systems for managing correspondence between a cache memory and a main memory, only one of these three principles is implemented. In general, the third principle is preferred.

The invention applies more specifically to a shared-memory multiprocessor architecture, i.e. a network of processors with a main memory shared between the processors and comprising a plurality of nodes for access to the main memory interconnected with one another and the processors. In this type of architecture, the processors may be combined in blocks of two to sixteen processors, these blocks generally being called "clusters". Each of these clusters has its own hierarchy of cache memories capable of temporarily storing cache lines and is directly connected to a node of the network. Reserved for very large systems at the beginning of the computing era, the multiprocessor architectures gradually spread to workstations, personal computers, on-board systems and cell phones, owing to constant progress in technological integration, in particular making it possible to integrate full systems on a chip called SoC (for "System on Chip").

The system for managing cache coherence in such an architecture then comprises:
 a set of directories distributed between the nodes of the network, each directory comprising a correspondence table between cache lines and information fields on said cache lines,
 means for updating directories by adding cache lines, modifying cache line information fields or deleting cache lines in the correspondence tables.

These directories are generally called "directories". More specifically, a directory associated with a node of the network of processors establishes and keeps up-to-date a list of the cache lines temporarily stored in the cache memory hierarchy of the cluster connected to it. In other words, a cache line corresponds to an entry of the directory. Each cache line of this list is then associated with information in the form of the aforementioned correspondence table. Depending on the cache coherence management protocol implemented, and depending on the way in which a set of cache memories temporarily storing the same cache line at a given time is to be represented, there may be more or less of this information, and various types.

In addition, it should be noted that, on the scale of a cluster of processors, each cache memory of a hierarchy is itself generally associated with a directory specific to it and that, itself, also gets a list of cache lines temporarily stored in said cache memory. The directory of a cache memory establishes the correspondence between the cache line and its address in the main memory. But in a cache memory hierarchy, a rule of inclusion of a lower level in an upper level is generally used so that, for example, a cache memory of level L2 shared between a plurality of cache memories of level L1 requires the latter to contain only cache lines that it contains itself. Thus, when a cache coherence management instruction (for example for cache line invalidation) is applied to an upper-level cache memory, it is propagated to all of the lower-level cache memories that are dependent upon it.

The cache coherence management protocol may be of known different types, including an MSI ("Modified, Shared, Invalid") protocol, an MESI ("Modified, Exclusive, Shared, Invalid") protocol, an MOESI ("Modified, Owned, Exclusive, Shared, Invalid") protocol, or the like. Regardless of the type, in order for such a protocol to work, it is important for lists of cache memories sharing cache data lines to be present in the network of processors in one form or another, so as to propagate the updates or instructions ensuring coherence of the cache data for read and write operations.

A first solution for representation of these lists, called centralized, may be envisaged when access to the main memory is distributed across the network, each node having access to a given partition of the main memory. This partition and assignment to a node are performed either in a fixed manner, owing to a certain number of most significant bits of the data lines, or dynamically, for example by means of correspondence tables managed by the operating system of the network of processors.

According to this first solution, the list of nodes of the network sharing, in the cache, the same data line is entirely localized in the directory of the node assigned to the main memory partition comprising this data line. According to a first alternative representation, a bit vector is associated with the data line considered in the directory, each bit of said vector corresponding, for example, to a node or to a processor of the network. The bit is at "1" when the corresponding element comprises the cache data line and at "0" if not. But this representation quickly becomes ineffective when the network of processors becomes large, also bearing in mind that, in general, the number of data lines strongly shared in the cache is extremely small in a multiprocessor system. Thus, according to a second alternative representation, it is advantageous to construct a linked list of variable size, the head of which is located in the directory in association with the data line considered, and the following portion of which is stored in another so-called "heap" memory of the node. The list head may consist at least of the element that has a first copy of the data line in the cache, or, according to other equivalent embodiments, distinguished only by the compromise between the size of the directory and that of the heap memory, of the N first elements that have said copy. However, this second representation has the disadvantage of quickly causing saturation of the heap memory once the number of elements sharing the same data line becomes large.

In general, this first solution also has the disadvantage of always having to return to the centralizing node in order to manage the coherence of caches storing a data line, which is not optimal in terms of data traffic through the network and path lengths travelled by the messages.

Other solutions therefore consist in distributing the representation of a list of cache memories sharing the same cache data line between a plurality of nodes of the network.

A first of these other solutions is, for example, described in the article of Thapar et al, entitled "Linked list cache coherence for scalable shared memory multiprocessors", published in Proceedings of 7th International Parallel Processing Symposium, Newport, Calif. (US), pages 34-43, 13-16 Apr. 1993. It consists in linking to one another the caches sharing the same data line, from the node assigned to said data line in the main memory. In the directory of the node assigned to said data line, a field points to a first cache memory (or first node) temporarily storing a copy of said data line in the cache. If appropriate, in the directory of the first cache memory (or first node), a field associated with this cache line points to a second cache memory (or second node) also temporarily storing a copy of said data line in the cache, and so on and so forth. Each time a cache memory (or node) must be added to the list, it is inserted, for example, between the node assigned to the data line and the first cache memory of the linked list, then itself becoming the first cache memory. In practice, it transmits a request in this sense to the node at the head of the linked list, which provides it in response with the identifier of the first cache memory to which it must be linked.

A first problem associated with this solution is that, to manage the coherence of caches sharing the same data line, it is necessary to pass through the network from one node to the other following the order of the chain. However, this order is historically defined independently of the topology of the network. The path to be travelled by the messages therefore is not optimal. A second problem is associated with the management of deadlock incidents. Such an incident occurs when a plurality of buffer memories located at the input or output of nodes of the network are mutually blocked. In other words, there is a deadlock when a plurality of buffer memories are full and each cannot be cleared as long as the others are not cleared. However, these deadlock situations in cache coherence management transactions are inevitable in a solution of distribution of each list of cache memories sharing the same data line. To be cleared, at least some of the blocked transactions must be deleted, generally at the risk of losing them without the certainty of being able to restart them later.

A second of these other solutions of distributed representation of lists is, for example, described in the article of Yuang et al, entitled "Towards hierarchical cluster based cache coherence for large-scale network-on-chip", published in Proceeding of 4th International Conference on Design & Technology of Integrated Systems in Nanoscal Era, Cairo (EG), pages 119-122, 6-9 Apr. 2009. It consists in hierarchically organizing the network of processors by partitioning it into regions. For example, for a network of 256 processors, the whole system may be partitioned into 16 regions of 16 processors. In each region, for a data line, one of the nodes centralizes in its directory the list of cache memories sharing said data line in cache. It is, for example, the node topographically located in its region in the same location as the node assigned to the main memory partition containing said data line. At a first level, the node assigned to the main memory partition containing the data line considered comprises, in its directory, the list (in the form of a vector or linked list, for example, as for the centralized list representation solution) of regions storing, in the cache, a copy of said data line. At a second level, each centralizing node of each region for the data line considered comprises, in its directory, the list (in the form of a vector or a linked list, for example) of cache memories storing a copy of said data line.

This solution is more robust than the previous in deadlocks because it is akin to a hierarchically organized centralized representation, but it is somewhat rigid, in particular as it imposes constraints if the system is to be divided into independent subsystems. It nevertheless does not make it possible to avoid the risk of deadlock if the messages are transmitted in multicast mode (i.e. from one source to a plurality of destinations), as they must then be transmitted in unicast mode (i.e. from one source to a single destination).

A third of these other solutions of distributed list representation, which will be referred to as INCC in the remainder of the description, is, for example, described in the article of Eisley et al, entitled "In-network cache coherence", published in Proceeding of 39th Annual IEEE/ACM International Symposium on Microarchitecture, Orlando Fla. (US), pages 321-332, 9-13 Dec. 2006. It consists in associating a tree, represented in the directories of the different nodes of the network, with each data line having a copy stored in the cache in at least one of the cache memories of the network. This solution may also be envisaged when access to the main memory is distributed across the network, each node having access to a given partition of the main memory for which it is qualified as "home". The tree associated with a data line links the home node to all of the nodes of the network, the cluster of processors of which has a copy in the cache of said data line. Owing to the property of inclusion of cache memories of level L1 in those of level L2, the directory of a node of the network does not have to manage the list of cache memories of level L1 of its cluster of processors, which have a copy in the cache of the data line considered, this being managed by the cache memory of level L2. According to a possible implementation of the INCC solution, in the directory of each node of the network belonging to the tree associated with a data line comprising one or more copies in the cache, status fields are provided so as to indicate, inter alia, whether this node actually has a copy in the cache of the data line, which directions (for example North, South, East, West) lead to another node of the tree in the network, which direction leads to the node, called a "root", historically having first stored said data line in the cache, whether said node is itself the root node, and so on.

An advantage of this solution is that it defines paths to be followed by the messages in the trees while respecting the topology of the network. The path to be followed by the cache coherence management messages is therefore optimized. However, as the construction or destruction of a tree may be dynamic and occur along the path followed by a transaction, any deadlock situation becomes problematic. Indeed, to be released from this, it is appropriate to delete at least some of the blocked transactions. However, if these transactions are, for example, accompanied by destruction of a tree, such a deletion could result in the permanent loss of the thread since the transmitters of these instructions may not be found in order to retransmit the transactions concerned. One possibility would then be to use a special protection channel with centralized management, for example by means of a token that would circulate through the network by a special ring path, ensuring that only one request at a time circulates in the protection channel. This is described in the article of Lankes et al, entitled "Comparison of deadlock recovery and avoidance mechanisms to approach message dependent deadlocks in on-chip networks", published in Proceeding of 4th IEEE/ACM International Symposium on Networks-on-chip, Grenoble (FR), pages 17-24, 3-6 May 2010. However, this possibility is not satisfactory because it is not adapted to large processor networks. Moreover, it requires the terminal nodes not to be dependent themselves upon other resources or other messages. Finally, it is not adapted to the INCC solution, in which messages are propagated in trees and are therefore led to be duplicated and to fork off, making the management of a single token very difficult in this case.

It may thus be desirable to provide a cache coherence management system that makes it possible to overcome at least some of the aforementioned problems and constraints.

A system for managing cache coherence in a network of processors equipped with cache memories is therefore proposed, said network having a main memory shared between the processors and comprising a plurality of nodes for access to the main memory interconnected with one another and the processors, said system comprising:
  a set of directories distributed between the nodes of the network, each directory comprising a correspondence table between cache lines and information fields on said cache lines,
  means for updating the directories by adding cache lines, modifying information fields of cache lines or deleting cache lines in the correspondence tables, wherein:
  in each correspondence table and for each cache line that it identifies, at least one field is provided for indicating a possible blocking in a transaction relative to the cache line considered, when said blocking occurs in the node associated with the correspondence table considered, and
  the system comprises means for detecting fields indicating a transaction blocking and for restarting each transaction detected as being blocked from the node in which it is indicated as being blocked.

Thus, owing to the invention, by taking advantage of the directories distributed between the nodes of the network so as to provide a field for indicating a possible blocking, a deadlock situation may be simply and effectively resolved, regardless of the cache coherence management solution used, including when it is a solution of distributed representation of the lists of cache memories sharing the same data lines. Indeed, it is enough for the detection means also provided to identify the blocking indication fields so as not to lose the blocked transactions, even if they must be deleted in order to leave the deadlock situation. By also restarting a transaction from the node in which it is indicated as being blocked, time and efficiency are saved with respect to a solution in which the transaction is retransmitted from its initial transmitter.

Optionally, each node of the network comprises a module for automatic search of fields indicating a transaction blocking in the correspondence table associated with it and for restarting each transaction detected as being blocked from said node.

Also optionally, each node of the network comprises:
  a protocol engine interacting with the directory associated with said node for implementation of a cache coherence management protocol, at least one input buffer memory arranged upstream of the protocol engine in the direction of transmission of the transactions through the node, at least one output buffer memory arranged downstream of the protocol engine in the direction of transmission of the transactions through the node, and the module for automatic search for and restarting of each node is integrated in the architecture of the node so as to be capable of transmitting requests to restart blocked transactions to the attention of the protocol engine, receiving an acknowledgement from the protocol engine each time the latter processes a restart request, and receiving notifications of blocking or unblocking of the node coming from said at least one output buffer memory.

Also optionally, each node of the network further comprises a multiplexer arbiter arranged upstream of the protocol engine and receiving, at the input, data from each input buffer memory, and the requests to restart blocked transactions to the attention of the protocol engine transmitted by the automatic search and restart module, and the automatic search and restart module is implemented in the form of a finite-state machine that includes:

a first idle state in which no transaction is detected as being blocked, a second waiting state, when the node is in a deadlock situation, in which the retransmission of transactions stored in said at least one input buffer memory is abandoned, the fields for indicating a possible blocking of these transactions are set to a value indicating an actual blocking for the cache lines corresponding to these transactions, and said at least one input buffer memory is cleared of these transactions, a third arbitration state, when the node is in an unblocked situation, in which a request to restart a transaction detected as being blocked is waiting to be processed by the protocol engine, and a fourth restarting state, when the node is in an unblocked situation, in which a request to restart a transaction detected as being blocked is being processed by the protocol engine.

Also optionally, lists of cache memories sharing cache lines are represented in the network of processors for implementing a cache coherence management protocol, the representation of each list of cache memories sharing the same cache line being distributed between a plurality of directories of nodes of the processor network, including at least the directories of the nodes, called cache nodes, connected to processors, the cache memories of which temporarily store said cache line.

Also optionally, the directories between which the representation of a list of cache memories sharing the same cache line is distributed further comprise the directories of nodes for interconnection of said cache nodes so as to form a tree, distributed in the directories of the nodes of the network, for representation of said cache line, the correspondence table of each directory of a node of said tree comprising, for said cache line, status fields intended to indicate, inter alia, whether said node actually has a copy of the cache line, which directions among a set of predetermined directions lead to another node of the tree in the network, which direction leads to the node of the tree, called a "root", historically having first stored said cache line, and whether said node is itself the root node of the tree.

An electronic chip is also proposed, which comprises:

a network of processors equipped with cache memories, said network having a main memory shared between the processors and comprising a plurality of nodes for access to the main memory interconnected with one another and the processors, and a system for managing cache coherence as defined above.

A method for managing cache coherence in a network of processors equipped with cache memories is also proposed, said network having a main memory shared between the processors and comprising a plurality of nodes for access to the main memory interconnected with one another and the processors, said method comprising the following steps:

generation of directories distributed between the nodes of the network, each directory comprising a correspondence table between cache lines and information fields on these cache lines, updating of directories by adding cache lines, modifying information fields of cache lines or deleting cache lines in the correspondence tables, and further comprising the following steps:

when a blocking of a transaction relative to a cache line is detected in a node of the network, updating of at least one field for indicating this blocking in the corresponding cache line of the correspondence table of the directory of said node, detection of fields indicating the blocking of a transaction in at least one directory of at least one node of the network, and restarting of each transaction detected as being blocked from the node in which it is indicated as being blocked.

Optionally, the detection comprises an automatic search of the fields indicating a transaction blocking in each directory of each node of the network, said automatic search for and the restarting of transactions detected as being blocked in a node of the network being performed in a circular manner in the correspondence table of the directory of said node, by means of:

a first pointer, called the work pointer, scanning the lines of the correspondence table so as to cause a transaction to be restarted each time the field for indicating a blocking relative to a cache line indicates a transaction blocking, and a second pointer, called the read pointer, performing a control function by being positioned on the line preceding that indicated by the current value of the work pointer each time a blocking of the node is detected.

A computer program downloadable from a communication network and/or recorded on a computer-readable medium and/or executable by a processor is also proposed, which includes instructions for executing the steps of a cache coherence management method as defined above, when said program is executed on a computer.

The invention will be easier to understand in view of the following description, provided solely as an example and with reference to the appended drawings, wherein.

Figure 1:
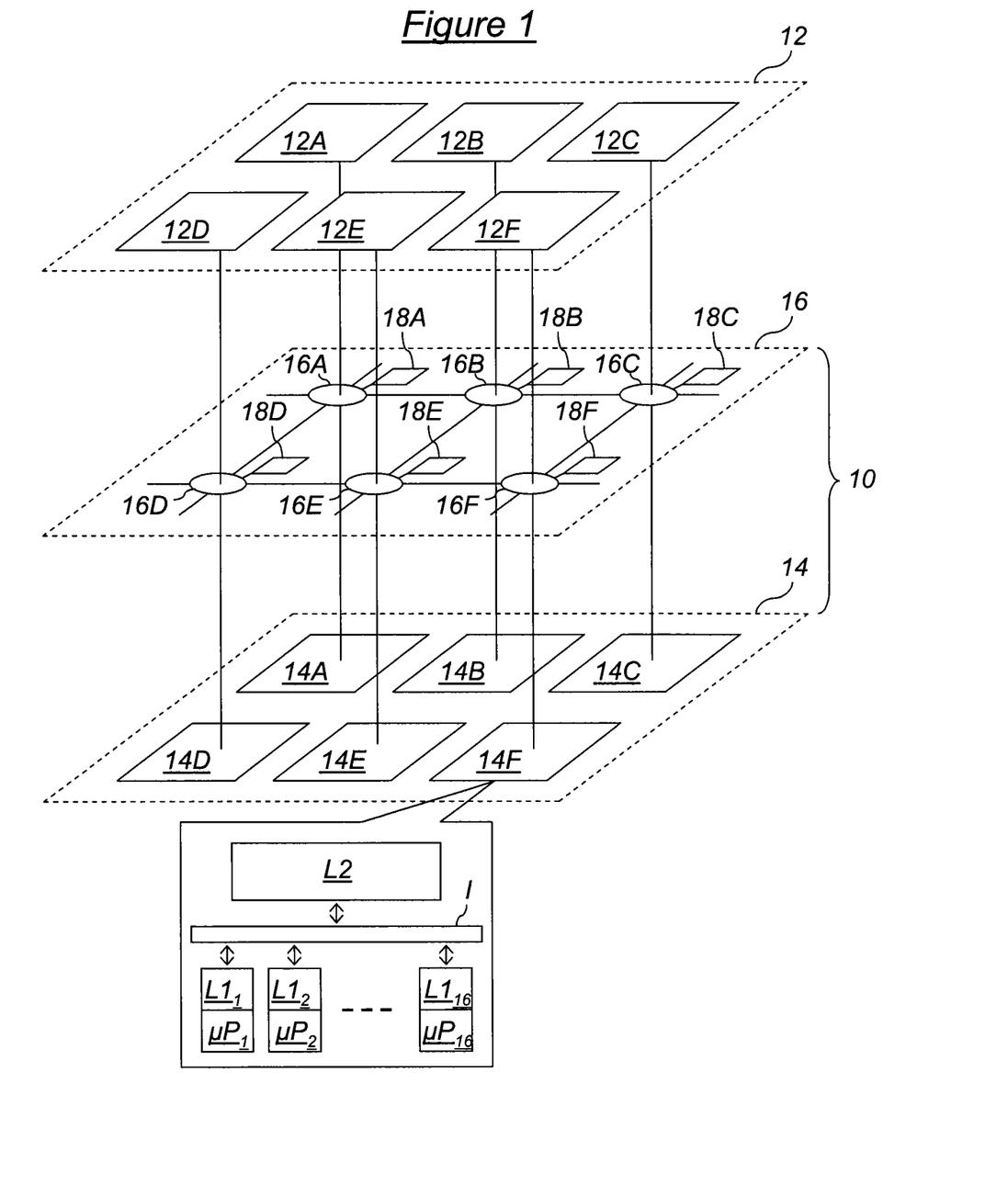
FIG. 1 schematically shows the general structure of an electronic chip with a network of processors comprising a cache coherence management system according to an embodiment of the invention.

The digital processing device shown diagrammatically in FIG. 1 comprises an electronic chip 10 connected to a high-capacity memory used as a main memory 12. The electronic chip 10 comprises a network of processors equipped with cache memories, said network having the main memory 12 shared between the processors and comprising a plurality of nodes for access to the main memory interconnected with one another and the processors. In the particular example of FIG. 1, the main memory 12 is considered to be external to the electronic chip 10 and arranged in a layer above it, but it may be considered that the electronic chip 10 integrates this main memory 12 layer, in a multilayer architecture, for example. The main memory 12 layer is responsible for storing the data and program instructions intended to be used by the processors.

In the particular example of FIG. 1 as well, the processors are combined in clusters arranged in a matrix on the same lower layer 14 of the electronic chip 10. Only six clusters denoted by references 14A, 14B, 14C, 14D, 14E and 14F are shown, but any number of clusters may of course be envisaged. Cluster 14F is presented in detail but the other clusters may have the same architecture. This is in the form of sixteen processors $\mu P_1$, $\mu P_2$, ..., $\mu P_{16}$ respectively equipped with sixteen first-level cache memories $L1_1$, $L1_2$, ..., $L1_{16}$. These sixteen first-level cache memories $L1_1$, $L1_2$, ..., $L1_{16}$ are linked to a common second-level cache memory L2 by means of a local interface I that manages, for example, the inclusion rules between the second-level cache memory and the first-level cache memories. The set of processors may be homogeneous (all of the processors are of the same type) or heterogeneous, using different types of processors: general processors (CPU), graphic processors (GPU) or signal processing processors (DSP), etc. In addition, a cluster may have a hierarchy of cache memories with more than two levels.

An upper layer 16 of the electronic chip 10 comprises the nodes for access of the clusters 14A, 14B, 14C, 14D, 14E and 14F to the main memory 12, in an amount of one node per cluster of the lower layer 14. Only six nodes denoted by references 16A, 16B, 16C, 16D, 16E and 16F are therefore represented but any number of nodes may of course be envisaged. These nodes are also interconnected with one another according to a matrix structure with four directions North (N), South (S), East (E) and West (W), which makes it possible to locate them topologically one with respect to another and to move in this network which they constitute. Finally, each node 16A, 16B, 16C, 16D, 16E, 16F is connected to a corresponding partition 12A, 126, 12C, 12D, 12E, 12F of the main memory 12 to which it is assigned, as indicated above. The interconnections of the nodes also make it possible to link the electronic chip 10 to any peripheral elements. Practically speaking, each node comprises one or more input and output buffer memories for the transmission of transactions, in particular cache coherence management transactions, in packet switching mode.

As also indicated above, a directory 18A, 18B, 18C, 18D, 18E or 18F is assigned to each node 16A, 16B, 16C, 16D, 16E or 16F of the upper layer 16, which directory establishes and keeps up-to-date the list of cache lines temporarily stored in the hierarchy of cache memories of the cluster 14A, 14B, 14C, 14D, 14E or 14F connected to it.

Figure 2:
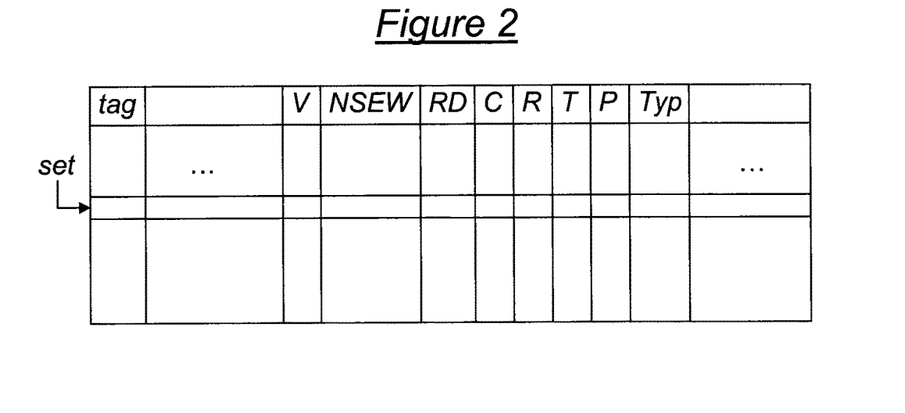
FIG. 2 shows the fields of a directory associated with a node of the network of processors implemented in the electronic chip of FIG. 1, FIG. 3 schematically details the architecture of a node of the network of processors implemented in the electronic chip of FIG. 1, FIG. 4 schematically shows the operation, in the form of a finite-state machine, of a module for automatic search for and restarting of blocked transactions implemented in the node of FIG. 3.

An example of a directory capable of being assigned to any one of the nodes 16A, 16B, 16C, 16D, 16E to 16F is shown in FIG. 2. It corresponds to a specific embodiment in which the correspondence between a partition of the main memory 12 and the cache memory of level L2 of the corresponding cluster, or more generally between the main memory 12 and the cache memories of the network of processors, is established according to an N-way set associative correspondence principle. It also corresponds to a specific embodiment in which the INCC solution is implemented.

In accordance with the principle of N-way set associative correspondence, a set is assigned to each data line of the main memory in a deterministic and non-configurable manner on the basis of its address, more specifically on the basis of a certain number of predetermined consecutive bits qualified as a "set" of the address @ of each data word in the main memory. In this set, the selection of a way is a priori free with verification of availability and/or age of the ways of the set.

It is the set of the address @ that defines the line that must be assigned to the corresponding data line in the correspondence table of the directory shown in FIG. 2. The first column of this correspondence table identifies the tag of the address @, i.e. all the bits that, with the set, completely identify the data line containing that word with address @. The other columns of this correspondence table concern status fields that are more or less broad according to the cache coherence protocols (MSI, MESI, MOESI, ...) and implementation solutions (INCC, ...) envisaged.

In accordance with the INCC solution, a binary validity field "V" indicates whether the entry is valid, i.e. whether the cluster associated with this directory is actually part of the tree associated with the data line considered. Four direction bits "NSEW" indicate the directions N for North, S for South, E for East and W for West, which lead to another node of the tree considered in the network of nodes. A two-bit root direction field "RD" indicates which of the directions previously indicated is that which leads to the root node of the tree considered. A binary copy field "C" indicates whether the cluster associated with this directory actually stores, in the cache memory, a shared copy (i.e. in the "Shared" state in the sense of cache coherence management protocols MSI, MESI et MOESI) of the data line considered. A binary root field "R" indicates whether the cluster associated with this directory is itself the root of the tree considered. Also in accordance with the INCC solution, the role of the root of a tree associated with a data line is to be the preferred (but not exclusive) provider of copies of the data line. Finally, in accordance with the INCC solution, a binary field "T" for indicating an invalidation in progress (for "Touched") is added in the column of the correspondence table to indicate whether an invalidation in progress was locally required for the data line considered in the node associated with said directory. It should be noted, however, that there are many ways to implement the INCC solution. Therefore, it is a family of solutions that use a way in which to maintain the lists of copies of cache lines in the form of virtual trees distributed across the network of processors.

Thus, when a processor transmits a data line request (read), this request is first routed in the network to the home node, i.e. that having access to the main memory 12 partition comprising said data line. Each time a node is passed, the corresponding directory is consulted in order to detect whether said node belongs to the tree associated with the data line required (if it exists). Once the tree is reached, the request is routed to its root, owing to direction information indicated in the corresponding fields, through the links of the tree. However, once the request reaches a node that has a shared copy of the data line, it is the node that sends a response and the data line to the transmitter of the request. When the response leaves the tree, a new branch of the tree is dynamically constructed as it progresses to the node of the transmitter of the request, which thus becomes a new node with a shared copy of the tree.

When a processor wants to modify a data line (write), it may, according to the cache coherence management protocol used, request exclusivity on this data line. If a tree already exists for this data line, it is dynamically destroyed by the transmission of an invalidation request propagated in the tree. Also according to the protocol used, if the data line has already been modified by another node, it is returned to the home node by the root node of the tree to be destroyed. Then the home node returns the data line for modification by the transmitter of the modification request, thus constructing a new tree in which the node of the transmitter of the modification request becomes the root node.

In general, the read or write transactions comprise at least one request and one response to said request. They sometimes particularly require, for good operation of the cache coherence management protocol, the transmission, in the network of processors equipped with caches, of requests for invalidation of cache lines and acknowledgement messages of these invalidations. For example, certain cache coherence management protocols require that, before modifying a data line, a cache memory exclusively appropriate this line: all of the other cache memories having a copy of this line must be invalidated, make it known with an acknowledgement message and produce their copy if it was locally modified. The new modification may take place only when the acknowledgement process has been completed. Similarly, when a cache memory preempts a cache line, it may be required that at least some of the other cache memories sharing this cache data line also be invalidated. These invalidation/acknowledgement processes are sometimes relatively complex. Other cache coherence management protocols, which accept that a cache data line be shared for writing, require each writing in a cache memory to be transmitted to all of the other cache memories sharing the data line concerned. The objective is to ensure the sequentiality of the transactions or, in other words, for everything to happen as if the different transactions were occurring one after another while they are propagated in parallel in the network.

In a solution with distributed representation of each list of cache memories sharing the same data line, in particular in the aforementioned INCC solution, it is unfortunately not possible to avoid transaction deadlock situations, even by providing virtual channels by request types between the nodes of the network of processors. Indeed, it is easily demonstrated that a plurality of transactions of the same type may be mutually blocked and that the risk that this will occur cannot be avoided. It is only possible to detect deadlocks by means of time counters triggering an alarm (for example a blocking notification) if a request is not satisfied after a predetermined time period or if an input or output buffer memory of a node of the network is not cleared of a data packet after a predetermined time period. It is then possible to resolve them by abandoning at least some of the blocked transactions.

However, in a solution with distributed representation of each list of cache memories sharing the same data line, when a transaction is abandoned it is not always possible to retransmit it since its transmitter may be lost or incapable of being notified of such an abandonment. This is in particular the case in the INCC context in which the construction/destruction of a tree is dynamic, along the path followed by a transaction. In particular, the invalidation transactions do not return a response to the transmitter of an invalidation request, but converge toward the home node of the tree concerned. The tree is dynamically destroyed by being progressively reduced around the home node, and the transmitter of the invalidation request loses any link with the tree, thereby becoming incapable of retransmitting it.

It is also not possible to envisage purely and simply abandoning a transaction, in particular an invalidation transaction, without threatening the cache coherence management protocol and therefore threatening the coherence of the system as a whole.

It is therefore proposed that the correspondence table of the directory shown in FIG. 2 be enriched with new status fields specifically dedicated to deadlock management. Thus, a binary field "P" for indicating a blocking in the transaction in progress (for "Pending") is added in the column of the correspondence table to indicate whether a transaction relative to the data line considered is locally blocked in the node associated with said directory, more specifically in the input or output buffer memory of said node. A field "Typ" for identifying a type of blocked transaction is optionally added in the column of the correspondence table to identify the type of transaction indicated as being blocked in the node associated with said directory.

At a minimum, when the INCC solution is implemented and when the risks of deadlock concern only invalidation requests and messages for acknowledgement of these invalidations, only the binary field "P" is really necessary. In practice, when an invalidation request or an acknowledgement message is detected as being blocked in a node of the network belonging to the tree of the data line concerned by this request or this message, the field "P" of the corresponding line of the correspondence table of the directory associated with this node is set to "1" and the transmission of the transaction to other nodes is temporarily abandoned. When the buffers of the node are again unblocked, an automatic search process for fields "P" switched to "1" awakens the abandoned transactions and restarts them from said node. In the case of INCC, it is not useful to identify the type of transaction because, on the one hand, an invalidation request may be restarted at the risk of being repeated without damage to the cache coherence management protocol and because, on the other hand, it is easy to determine whether this blocked transaction was an acknowledgement message simply by determining the state of the data line concerned by means of its other fields.

To use the information provided by the binary fields "P" of each directory and to restart the blocked transactions whose retransmissions have been abandoned, the cache coherence management system shown in FIG. 1 comprises means for detecting binary fields "P" indicating a transaction blocking and for restarting each transaction detected as being blocked from the node in which it is indicated as being blocked. Advantageously, these detection means comprise at least one module for automatic searching for binary fields "P" indicating a transaction blocking. Also advantageously, the system even comprises an automatic search and restart module in each node of the network, as shown in FIG. 3.

Figure 3:
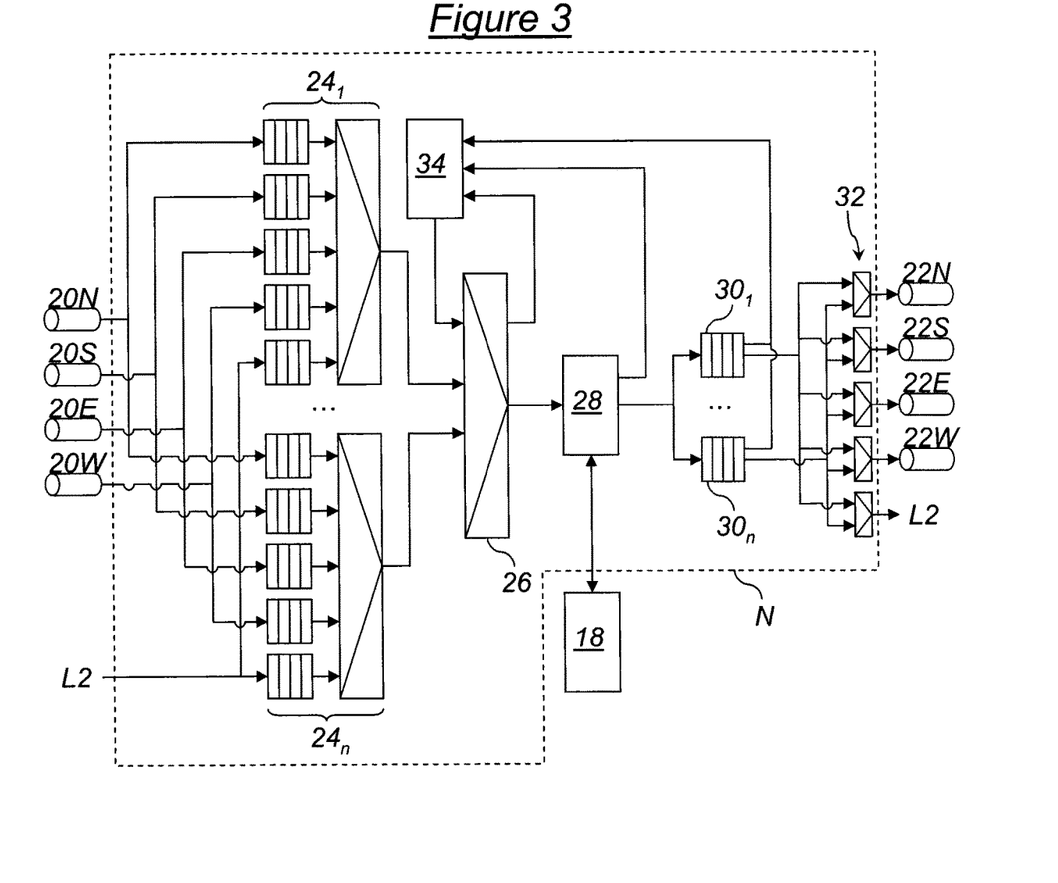

FIG. 3 indeed shows a possible architecture of any one of the nodes of the network, associated with its directory, which will be designated by the generic reference 18.

This node, identified by the generic reference N applying to all of the aforementioned nodes 16A, 16B, 16C, 16D, 16E, 16F, is configured so as to have four inputs for the messages coming from other nodes of the network, one for each possible direction of origin in the matrix network of nodes 16A, 16B, 16C, 16D, 16E, 16F, i.e. an input 20N for the direction "North", an input 20S for the direction "South", an input for the direction "East" and an input 20W for the direction "West". It also has an input for the messages coming from the cache memory of level L2 of the cluster to which it is directly connected.

This node N is also configured to have four outputs for the messages addressed to other nodes of the network, one for each possible destination direction in the matrix network of nodes 16A, 16B, 16C, 16D, 16E, 16F, i.e. an output 22N for the direction "Nord", an output 22S for the direction "South", an output 22E for the direction "East" and an output 22W for the direction "West". It also has an output for the messages addressed to the cache memory of level L2 of the cluster to which it is directly connected.

For the protocol messages, which will be qualified transactions below, each of these inputs is distributed between a plurality of virtual channels $24_1, \ldots, 24_n$, for example on the basis of the type of incoming transaction. Each virtual channel $24_i$ comprises as many buffer memories as inputs, i.e. five in this example, and a multiplexer for performing, at each instant, a selection between the inputs and providing only one output. The outputs of the virtual channels $24_1, \ldots, 24_n$ are provided at the input of a multiplexer arbiter 26 designed to choose, at each instant, which virtual channel may have access to a protocol engine 28 of the node N. It is this protocol engine 28 that has access to the directory 18 of the node N for implementation of the cache coherence management protocol implemented. It then determines how to respond to each incoming transaction, and in particular which output(s) of the node N to transmit it to after its local processing. Thus, the node N comprises as many output buffer memories $30_1, \ldots, 30_n$ as virtual channels, at the output of the protocol engine 28, and as many output multiplexers (identified by the general reference 32) as outputs of the node, i.e. five output multiplexers 32, at the output of the output buffer memories $30_1, \ldots, 30_n$. Each output multiplexer 32 more precisely receives, at the input, the output of all of the output buffer memories $30_1, \ldots, 30_n$.

For the data messages, when they are distinguished from protocol messages, bearing in mind that they do not necessarily have to be processed by the protocol engine 28, they may be directly routed (this option is not shown in FIG. 3, for the sake of clarity), from the input 20N, 20S, 20E, 20W or L2 corresponding to the direction from which they come, at the output of the node N, more specifically at the input of each output multiplexer 32, with the exception, however, of the direction from which they are coming. They thus avoid passing through the protocol engine 28.

The operation of the protocol engine 28 is conventional and will not be described in detail. It should simply be specified that it is a serialization point and that each transaction, request or response, is processed atomically by reading the state of the line addressed by the transaction in the directory, by a decision based on the state of the line read, then by sending at least one output message to at least one of the output buffer memories. One of the decisions made by the protocol engine 28 may be to read or update a data line in the main memory 12. This request is then sent to a buffer memory (not shown in FIG. 3 for the sake of clarity) for access to the main memory 12. When it concerns reading in the main memory 12, it is sent with appropriate parameters so that said buffer memory for access to the main memory 12 directly places the data line read in a data packet with the correct destination.

Figure 4:
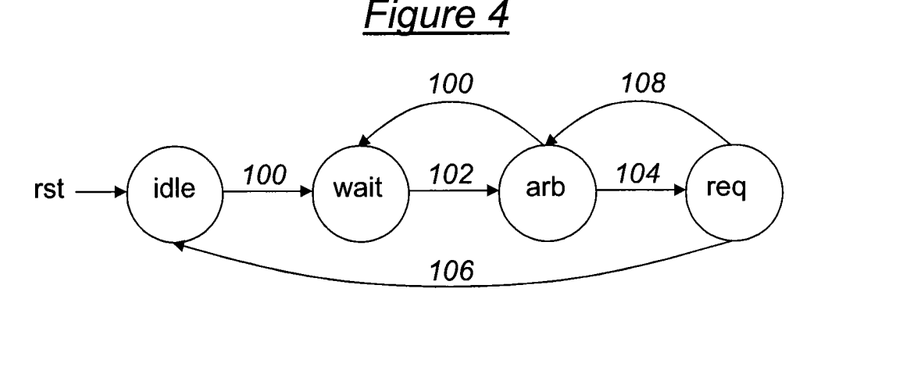

The node N finally comprises, as mentioned above, a module 34 for automatic searching of binary fields "P" indicating a transaction blocking in the correspondence table of the directory 18 and for restarting each transaction detected as being blocked from said node. This module 34 is, for example, implemented in the form of a finite-state the states and transitions of which are shown in FIG. 4. It is integrated in the architecture of the node N so as to be capable of transmitting requests to restart blocked transactions to the multiplexer arbiter 26, of receiving an acknowledgement from the multiplexer arbiter 26 each time the latter actually transmits a restart request to the protocol engine 28, of receiving an acknowledgement from the protocol engine 28 each time the latter actually processes a restart request, and of receiving blocking or unblocking notifications coming, for example, from the output buffer memories $30_1, \ldots, 30_n$ of the node N. In particular and according to the example chosen, if the virtual channel $24_1$ is assigned to the invalidation transactions including the invalidation requests and the acknowledgement messages, then the module 34 is informed of the blocking of an invalidation when it occurs in the output buffer memory $30_1$.

It should be noted that, in the case of a plurality of virtual channels, such as in the example presented in FIG. 3, a binary field "P" for each virtual channel must be provided in the directory if blocked transactions are to be restarted in each of the virtual channels. At a minimum, if a single binary field "P" is provided in the directory, only the transactions of a single preferred virtual channel will be capable of being restarted in the event of a blocking, for example the virtual channel $24_1$ of the invalidation transactions in the example chosen.

As shown in FIG. 4, a first idle state, "idle", of module 34 may be reached by rst resetting to "0" a read pointer RPT and a work pointer WPT managed by module 34 and physically represented by two state registers. In this "idle" state, module 34 does nothing, as it is at rest. The read pointer RPT and work pointer WPT point to lines (set values, as indicated in FIG. 2) of the correspondence table of the directory 18, the value "0" indicating, by convention, the first line of said correspondence table. In other words, they point to cache data lines in the network of processors. If the principle of correspondence between the main memory 12 and the cache memories of the network of processors has 1024 sets of N ways each, then the correspondence table shown in FIG. 2 comprises 1024 lines, value "1023" indicating, by convention, the last line of this correspondence table.

The function of the work pointer WPT is to circularly scan (from line "0" to line "1023", then return to line "0"), and for all of the ways, the correspondence table of the directory 18 as module 34 searches the binary fields "P" and requires transactions to be restarted as necessary. The read pointer RPT performs a control function, receiving the value of the work pointer WPT each time a blocking notification is received by module 34, so as then to be positioned on the line preceding that indicated by the work pointer WPT.

A second waiting state, "wait", of module 34 may be reached from the "idle" state after the execution of a blocking detection step 100. In accordance with this step 100, a blocking is detected by one of the output buffer memories $30_1, \ldots, 30_n$ once a message that it contains has not been capable of being transmitted to one of the outputs after a predetermined time corresponding to a timeout period and when a binary field "P" is provided for the corresponding virtual channel. In the example chosen, it is the output buffer memory $30_1$ that detects the blocking of an invalidation transaction. It then transmits a notification of this blocking to the module 34 after said timeout period, triggering its switch to the "wait" state, and the update from RPT to WPT-1. It also transmits a notification of said blocking to the multiplexer arbiter 26 and to the protocol engine 28 so that they can adapt to this particular situation. In this "wait" state, the input buffer memories of the virtual channel $30_i$ corresponding to the blocked output buffer memory are emptied by the local processing, by the protocol engine 28, of the transactions that they contain. This local processing comprises, in particular, the updating to "1" of the binary field "P" of the data line concerned by each transaction processed, indicating that a transaction is blocked. Each transaction processed when module 34 is in the "wait" state is therefore identified in this way as being blocked in the directory 18. Other fields of the correspondence table of the directory 18 may be updated, for example "V", "C", "R" or "T" (the field "T" must switch to "1" when the field "P" itself switches to "1") according to the nature of the transaction processed, but the retransmission at the output of the locally processed transactions is temporarily abandoned since the output buffer memory is blocked. Progressively, the emptying of the input buffer memories makes it possible to clear output buffer memories of other nodes in the vicinity of the blocked node N, themselves possibly blocked. Reciprocally, the neighboring nodes also blocked empty their input buffer memories so that the blocked output buffer memory of the node N may finally be unblocked.

A third arbitration state, "arb", of module 34 may be reached from the "wait" state after the execution of an unblocking detection step 102. In accordance with this step 102, an unblocking is detected by the output buffer memory $30_i$ that was blocked in the previous "wait" state. It then notifies the module 34 of the unblocking, thereby triggering the switch from this last state to the "arb" state and stopping the action of emptying the input buffer memories of the node N. In this "arb" state, in which an automatic search for blocked transactions is performed, module 34 addresses a request to restart transactions identified as being blocked to the multiplexer arbiter 26. This request identifies, by the value of the work pointer WPT, which line of the correspondence table of the directory 18 must be inspected in order to detect the binary fields "P" at "1". The multiplexer arbiter 26 itself manages its priorities between the incoming transactions, which may now be completely processed in consideration of the unblocking of the output buffer memories, and the restart requests received from module 34. Regardless of its selection rules, it is preferable not to consider the restart requests as a priority and not to accelerate the processing of transactions as soon as the unblocking is detected. Indeed, when the node N has just been unblocked, there is a notable risk of again flooding the output buffer memories by injecting too many requests into them. It is also necessary to consider the time for the blocking in the other neighboring nodes to be cleared. Finally, at any time during this "arb" state of module 34, it may go back to the "wait" state, with updating RPT to WPT-1 when a new execution of step 100 takes place, namely the detection of a new blocking among at least one of the output buffer memories $30_1, \ldots, 30_n$.

A fourth restart state, "req", of module 34 may be reached from the "arb" state after the execution of a step 104 for transmitting a request to restart transactions by the multiplexer arbiter 26 to the protocol engine 28. The switch from the "arb" state to the "req" state occurs upon receipt by module 34 of an acknowledgement from the multiplexer arbiter 26 marking the transmission of the request.

In this "req" state, and according to a simple yet non-optimal embodiment, the protocol engine 28 analyzes the state of the line pointed to by the value of the WPT pointer and for a given way value among the N possible ways (this way value being reset to 0 during the first switch from the "arb" state to the "req" state for a given WPT value). If the binary field "P" is at "1", it restarts the corresponding blocked transaction by transmitting, to at least one of the outputs of the node N, the appropriate message(s), then switches the corresponding binary field "P" to "0". More specifically, in consideration of the concrete example of restarting invalidation requests and acknowledgement messages as transmitted via the virtual channel $24_1$, once an invalidation request is locally processed by the protocol engine 28, it places the line in an actual destruction state (binary field "T" at "1") even if the invalidation request is blocked (binary field "P" at "1"). Thus, in the "req" state of module 34, the protocol engine 28 restarts one or more invalidation requests if the bit "P" is at "1". The invalidation request is indeed propagated in all directions in which the corresponding field ("NSEW") is at "1" and also to the cache memory of level L2 of the cluster associated with the node N if bit "C" is at "1". This may lead to a redundant propagation of invalidation requests if the corresponding tree has been blocked on a plurality of nodes, but this redundancy does not present any problem. Similarly, in the "req" state of module 34, the protocol engine 28 restarts an acknowledgement message if bit "T" is at "1", if just one direction in the "NSEW" field is at "1" and if bit "C" is at "0", even if bit "P" is at "0". The acknowledgement message is thus propagated in the only possible direction, enabling the actual destruction of the corresponding branch of the tree.

After possible restarting of transactions, and still in the "req" state of module 34, the protocol engine 28 performs a test:
- if the way analyzed is the last of the line identified by the value of WPT and if WPT=RPT (i.e. the work pointer has reached the control read pointer), then module 34 switches back to "idle" state in a step 106,
- if the way analyzed is the last of the line identified by the value of WPT and if WPT≠ RPT, then WPT is incremented by one unit, the value of the way to be analyzed is reset to 0 and module 34 switches back to the "arb" state in a step 108,
- if the way analyzed is not the last of the line identified by the value of WPT, then the value of this way is incremented by one unit, WPT is maintained at its current value and module 34 switches back to the "arb" state in step 108.

It should be noted that each time the protocol engine 28 has processed the way of a line, it may return an acknowledgement to module 34 in order to inform it so that it is the receipt of this acknowledgement that enables module 34 to switch back to the "arb" state by sending a new restart request, as necessary. It should also be noted that there is no direct transition from the "req" state to the "wait" state due to the timeout period. Indeed, if a transaction has just been restarted, a blocking may not be detected before module 34 has had the time to switch back from the "req" state to the "arb" or "idle" state.

According to an optimized alternative embodiment, a double loop on the value of the WPT pointer and the way value is avoided. Indeed, according to this optimized alternative in which an N-way set associative correspondence principle is applied, module 34 does not manage a way number to be consulted. It simply provides the set of the address @ and the protocol engine 28 simultaneously has access to all of the binary fields "P" of the set concerned. The protocol engine 28 is capable of detecting the first bit at 1 in the binary fields "P" of the set concerned in a single clock cycle. For this reason it is capable of detecting whether there is still a way to be processed for the set value considered or whether it is possible to switch to the next set value by indicating it to module 34. This optimized alternative therefore makes it possible to significantly reduce the number of requests that the module 34 must send to the protocol engine 28 in order to scan the entire directory.

Also alternatively, the operation of the module 34 may be accelerated by providing a register table explicitly indicating the sets (or lines of the correspondence table of the directory 18) for which transactions are identified as being blocked, thereby avoiding the need to scan all of the lines of the correspondence table by means of the work pointer WPT.

Also alternatively, it is possible to dispense with work and read pointers by providing a step of returning to the first line and the first way of the correspondence table each time the module 34 is notified of a blocking. However, such an alternative has the disadvantage of creating famines in the system when there are repetitive blockings.

It should finally be noted that, as the architecture of each node as described above shows, on the one hand, input buffer memories upstream of the protocol engine 28 and, on the other hand, output buffer memories downstream of the protocol engine 28, these are the input buffer memories which are chosen to be emptied in the event of a blocking ("wait" state in which the node is blocked) and the output buffer memories which are chosen for notification of blockings after timeout (transitions to the "wait" state) even though it is only an implementation choice and these functions may be entirely interchanged without going beyond the scope of the invention.

However, this implementation choice has a special advantage. Indeed, it is advantageous for the action of emptying buffer memories to unblock the node N and its neighbors to occur upstream of the protocol engine 28, because doing so downstream would add additional constraints in order to avoid returning to actions possibly performed by the protocol engine 28. In particular, this would make it necessary to wait for a transaction transmission actually to be performed by the node N in order to validate the local processing performed by the protocol engine 28 on this transaction: such a solution would be difficult to implement and could reduce the performance of the system. However, it does not make any difference a priori whether the blockings are detected upstream or downstream of the protocol engine 28. But it becomes advantageous if the blockings are detected after the timeout downstream of the protocol engine 28 when the number of buffer memories to be monitored at the output is smaller than the number of buffer memories at the input, which is generally the case.

Figure 5:
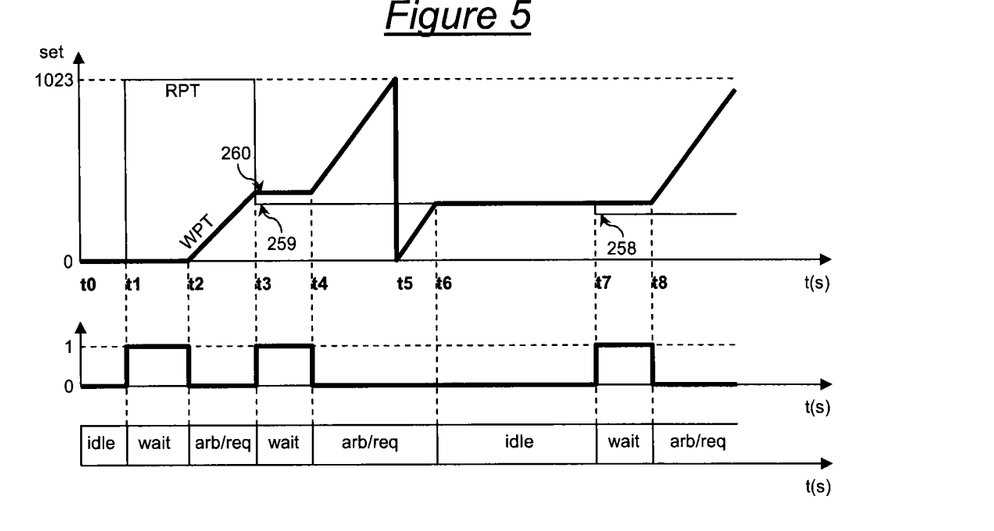
FIG. 5 shows, by means of diagrams, an example of a scenario implementing a cache coherence management method according to an embodiment of the invention.

To more concretely illustrate the operation of the module 34, a scenario is proposed in FIG. 5 with three diagrams represented on the same time scale. A first diagram shows the changes, between values 0 and 1023, corresponding to the number of lines in the correspondence table, in the WPT and RPT pointers during this scenario. A second diagram located below the first shows the changes in state, blocked (value "1") or unblocked (value "0"), of the node N concerned by this scenario. A third diagram shows the corresponding sequence of states of module 34 of the node N.

At a time t0 in the scenario proposed, the step rst is executed, so that WPT=RPT=0 and module 34 switches to the "idle" state. The node N is in the unblocked state.

At a time t1, module 34 is notified of a blocking. RPT is then updated to WPT-1, which is 1023 since the path of the correspondence table of the directory 18 is circular (i.e. modulo [1024]). The node N is in the blocked state and module 34 switches to the "wait" state to progressively empty the input buffer memories of the node N, which makes it possible also to progressively unblock the blocked transactions in the output buffer memories of the node N.

At a time t2, module 34 is notified of an unblocking. It then switches to the "arb" state while the node N switches to the unblocked state. Then the "arb" and "req" states follow one another for as long as transactions are to be restarted by the protocol engine 28 and the node N remains unblocked. From t2, the first diagram therefore shows a progression of the work pointer WPT toward the value of RPT while node N is in the unblocked state. It is noted that, contrary to what is shown for the sake of simplification, the WPT progression in fact has no reason for being linear.

At a time t3, module 34, in the "arb" state, is notified of a new blocking while WPT is at the value 260. RPT is then updated to WPT-1, which is 259. The node N is in the blocked state and module 34 switches from the "arb" state to the "wait" state in order to progressively empty the input buffer memories of the node N.

At a time t4, module 34 is notified of an unblocking. It then switches to the "arb" state while the node N switches to the unblocked state. Then the "arb" and "req" states follow one another for as long as transactions are to be restarted by the protocol engine 28 and the node N remains unblocked. From t4, the first diagram therefore illustrates a circular progression of the work pointer WPT to the value of RPT while node N is in the unblocked state. It should be noted that at time t4, when the restarting process restarts at line 260, line 260 should again be scanned from its first way.

At a time t5, the work pointer WPT returns to 0 after having reached the value 1023.

At a time t6, the work pointer WPT reaches the value 259 of the read pointer RPT, which causes the module 34 to switch to the "idle" state given that it is now assured that no more transactions are to be restarted in the node N.

At a time t7, the module 34 is notified of a new blocking while WPT is still at value 259. RPT is then updated to WPT-1, which is 258. The node N is in the blocked state and module 34 switches to the "wait" state in order to progressively empty the input buffer memories of the node N.

At a time t8, the module 34 is notified of an unblocking. It then switches to the "arb" state while the node N switches to the unblocked state. Then the "arb" and "req" states follow one another for as long as transactions are to be restarted by the protocol engine 28 and the node N remains unblocked.

The scenario may continue, but these first steps described above (from t0 to t8) made it possible to show all of the situations of sates and transitions that the module 34, the multiplexer arbiter 26 and the protocol engine may encounter during their operation.

It clearly appears that the cache coherence management system described above and the operation method thereof make it possible to effectively resolve deadlock situations, including when a solution with a distributed representation of lists of cache memories sharing the same data lines is chosen. It is precisely when the deadlock situations cannot be avoided due to a distributed representation of the lists and an impossibility for certain messages to be resumed at the source that the invention is most relevant.

It is therefore particularly, but not exclusively, appropriate in the context of an INCC-type representation. In the different examples with distributed representation of the lists cited above, it is, for example, also appropriate in the context of a representation with linked lists distributed in the network. According to this solution, deadlock situations cannot be avoided either, and it is costly to ensure that blocked transactions can be deleted and then resumed at the source. It is thus advantageous to consider the principles of the invention and to adapt them to the distributed representation in the form of linked lists, bearing in mind that fields may specifically be provided in node directories and that modules such as the modules 34 described above may also be locally implemented in each of the nodes in this context.

It should also be noted that the invention is not limited to the embodiment described above.

In particular, field detection means indicating a transaction blocking other than those envisaged above (i.e. an automatic search module 34 for each node of the network) may be envisaged as an alternative or as a complement.

In particular, it has been indicated that the multiplexer arbiter 26 itself manages its priorities between incoming transactions and the restart requests received from the module 34, and it is even preferable not to consider the restart requests as priorities. The result is that the scanning of the directory of a node in order to search for blocked transactions may be particularly slow when the protocol engine 28 is also heavily loaded by new incoming priority transactions. At the cost of additional complexity, it is therefore possible to provide complementary means for more quickly restarting certain blocked transactions. For example, when a new incoming transaction relates to a data line in which the binary field "P" indicates a transaction blocking, the latter may be restarted directly independently of the scanning of the directory by the module 34. In addition, when a node comprises pending transaction tables, these tables, which are smaller than the directory of the node, may be scanned regularly in order to detect blocked transactions and restart them. This has the advantage of targeting the restarting of blocked transaction, as a blocked transaction is truly hampered only when the network needs to use the line concerned by this transaction. Finally, the priority of certain restart requests may be progressively increased on the basis of the waiting time.

It will appear more generally to a person skilled in the art that various modifications may be made to the embodiment described above, in light of the teaching disclosed herein. In the claims below, the terms used must not be interpreted as limiting the claims to the embodiment disclosed in this description, but must be interpreted so as to include all equivalents that the claims are intended to cover owing to their wording and that can be carried out by a person skilled in the art applying general knowledge to the implementation of the teaching disclosed herein.

The invention claimed is:

1. A system for managing cache coherence in a network of processors including cache memories, the network including a main memory shared between the processors and a plurality of nodes for access to the main memory interconnected with one another and the processors, the system comprising:
the plurality of processors which each are associated with a separate cache memory and with one of the plurality of nodes;
at least one memory that stores a set of directories distributed between the nodes of the network, such that each node is assigned one of the directories, each directory comprising a correspondence table between cache lines and information fields on the cache lines; and
processing circuitry configured to update the directories by adding cache lines, modifying information fields of cache lines, or deleting cache lines in the correspondence tables,
wherein in each correspondence table and for each cache line identified, at least one field is provided for indicating whether a transaction relative to the cache line considered is blocked in the node associated with the respective correspondence table considered due to at least one buffer memory located at an input or output of the node associated with the respective correspondence table being full, wherein a request or a response of the transaction for the cache line originates at one of the nodes, as an initial transmitter of the request or the response of the transaction, and is passed along a route through one or more neighboring nodes in the network until the request or the response reaches a node corresponding to the cache line; and
the processing circuitry being further configured to detect fields indicating a transaction blocking and for restarting the transaction when the transaction is detected as being blocked, from the node in which it is indicated as blocked, which is a node from the plurality of nodes that is along the route from the initial transmitter to the node corresponding to the cache line as a result of there being no direct connection between the initial transmitter and the node corresponding to the cache line, without requiring that the initial transmitter of the request or the response of the transaction restart the transaction, when the at least one buffer memory which was full is no longer full,
wherein each node of the network comprises a module for automatic search of fields indicating a transaction blocking in the correspondence table associated with it and for restarting each transaction detected as being blocked from the node.

2. The system for managing cache coherence according to claim 1, wherein each node of the network comprises:
a protocol engine interacting with the directory associated with the node for implementation of a cache coherence management protocol;
at least one input buffer memory arranged upstream of the protocol engine in a direction of transmission of the transactions through the node;
at least one output buffer memory arranged downstream of the protocol engine in the direction of transmission of the transactions through the node; and
wherein the module for automatic search and restarting of each node is integrated in an architecture of the node to be configured to transmit requests to restart blocked transactions to attention of the protocol engine, receiving an acknowledgement from the protocol engine each time the protocol engine processes a restart request, and receiving notifications of blocking or unblocking of the node coming from the at least one output buffer memory.

3. The system for managing cache coherence according to claim 2, wherein each node of the network further comprises a multiplexer arbiter arranged upstream of the protocol engine and receiving, at an input, data from each input buffer memory and the requests to restart blocked transactions to the attention of the protocol engine transmitted by the automatic search and restart module, and wherein the automatic search and restart module is implemented in a form of a finite-state machine that includes:
- a first idle state in which no transaction is detected as blocked;
- a second waiting state, when the node is in a deadlock situation, in which the retransmission of transactions stored in the at least one input buffer memory is abandoned, fields for indicating a possible blocking of these transactions are set to a value indicating an actual blocking for the cache lines corresponding to these transactions, and the at least one input buffer memory is cleared of these transactions;
- a third arbitration state, when the node is in an unblocked situation, in which a request to restart a transaction detected as blocked is waiting to be processed by the protocol engine; and
- a fourth restarting state, when the node is in an unblocked situation, in which a request to restart a transaction detected as blocked is being processed by the protocol engine.

4. The system for managing cache coherence according to claim 1, wherein lists of cache memories sharing cache lines are represented in the network of processors for implementing a cache coherence management protocol, representation of each list of cache memories sharing a same cache line being distributed between a plurality of directories of nodes of the processor network, including at least the directories of the nodes, as cache nodes, connected to processors, the cache memories of which temporarily store the cache line.

5. The system for managing cache coherence according to claim 4, wherein the directories between which the representation of a list of cache memories sharing the same cache line is distributed further comprises the directories of nodes for interconnection of the cache nodes to form a tree, distributed in the directories of the nodes of the network, for representation of the cache line, the correspondence table of each directory of a node of the tree comprising, for the cache line, status fields to indicate whether the node actually has a copy of the cache line, which directions among a set of predetermined directions lead to another node of the tree in the network, which direction leads to the node of the tree, as a root, historically having first stored the cache line, and whether the node is itself the root node of the tree.

6. An electronic chip comprising:
- a network of processors including cache memories, the network including a main memory shared between the processors and a plurality of nodes for access to the main memory interconnected with one another and the processors; and
- a system for managing cache coherence according to claim 1.

7. A method for managing cache coherence in a network of processors including cache memories, the network including a main memory shared between the processors and a plurality of nodes for access to the main memory interconnected with one another and the processors, each of the plurality of processors being associated with a separate cache memory and with one of the plurality of nodes, the method comprising:
- generating directories distributed between the nodes of the network, such that each node is assigned one of the directories, each directory including a correspondence table between cache lines and information fields on these cache lines;
- updating the directories by adding cache lines, modifying information fields of cache lines or deleting cache lines, in the correspondence tables;
- when a blocking of a transaction relative to a cache line is detected in a node of the network due to at least one buffer memory located at an input or output of the node being full, updating at least one field for indicating the blocking in the corresponding cache line of the correspondence table of the directory of the node, detecting fields indicating the blocking of a transaction in at least one directory of at least one node of the network, wherein a request or a response of the transaction for the cache line originates at one of the nodes, as an initial transmitter of the request or the response of the transaction, and is passed along a route through one or more neighboring nodes in the network until the request or the response reaches a node corresponding to the cache line; and
- restarting the transaction when the transaction is detected as being blocked from the node in which it is indicated as being blocked, which is a node from the plurality of nodes that is along the route from the initial transmitter to the node corresponding to the cache line as a result of there being no direct connection between the initial transmitter and the node corresponding to the cache line, without requiring that the initial transmitter of the request or the response of the transaction restart the transaction, when the at least one buffer memory which was full is no longer full,
- wherein each node of the network performs automatic searching of fields indicating a transaction blocking in the correspondence table associated with it and restarting each transaction detected as being blocked from the node.

8. The method for managing cache coherence according to claim 7, wherein the detection comprises an automatic search of the fields indicating a transaction blocking in each directory of each node of the network, the automatic search for and restarting of transactions detected as being blocked in a node of the network being performed in a circular manner in the correspondence table of the directory of the node, by:
- a first pointer, as the work pointer, scanning the lines of the correspondence table to cause a transaction to be restarted each time the field for indicating a blocking relative to a cache line indicates a transaction blocking, and
- a second pointer, as a read pointer, performing a control function by being positioned on the line preceding that indicated by the current value of the work pointer each time a blocking of the node is detected.

9. A non-transitory computer-readable medium that stores a program for causing processing circuitry to execute a method for managing cache coherence in a network of processors including cache memories, the network including a main memory shared between the processors and a plurality of nodes for access to the main memory interconnected with one another and the processors, the plurality of processors which each are associated with a separate cache memory and with one of the plurality of nodes, the method comprising:
- generating directories distributed between the nodes of the network, such that each node is assigned one of the directories, each directory including a correspondence table between cache lines and information fields on these cache lines;
- updating the directories by adding cache lines, modifying information fields of cache lines or deleting cache lines, in the correspondence tables;

when a blocking of a transaction relative to a cache line is detected in a node of the network due to at least one buffer memory located at an input or output of the node being full, updating at least one field for indicating the blocking in the corresponding cache line of the correspondence table of the directory of the node, detecting fields indicating the blocking of a transaction in at least one directory of at least one node of the network, wherein a request or a response of the transaction for the cache line originates at one of the nodes, as an initial transmitter of the request or the response of the transaction, and is passed along a route through one or more neighboring nodes in the network until the request or the response reaches a node corresponding to the cache line; and restarting the transaction when the transaction is detected as being blocked from the node in which it is indicated as being blocked, which is a node from the plurality of nodes that is along the route from the initial transmitter to the node corresponding to the cache line as a result of there being no direct connection between the initial transmitter and the node corresponding to the cache line, without requiring that the initial transmitter of the request or the response of the transaction restart the transaction, when the at least one buffer memory which was full is no longer full, wherein each node of the network performs automatic searching of fields indicating a transaction blocking in the correspondence table associated with it and restarting each transaction detected as being blocked from the node.

* * * * *